Nov. 11, 1958 R. L. WATTS 2,859,644
MACHINE TOOL
Filed Jan. 2, 1958 6 Sheets-Sheet 1

Reid L. Watts,
INVENTOR.
BY
Ernest F. Oberheim
AGENT.

Reid L. Watts,
INVENTOR.
BY.
AGENT.

United States Patent Office 2,859,644
Patented Nov. 11, 1958

2,859,644

MACHINE TOOL

Reid L. Watts, Los Angeles, Calif., assignor to Hughes Aircraft Company, Culver City, Calif., a corporation of Delaware Application January 2, 1958, Serial No. 706,746

7 Claims. (Cl. 77—25)

This invention relates generally to machine tools and more particularly to an automatic machine tool arrangement.

The automatic control of machine tools frequently imposes limitations on the character of machine operations which may be automatically obtained with a single machine. The problem is primarily one of complexity in mechanical movements and electrical controls. Usually, such machine tools are special purpose devices performing relatively simple operations such as positioning a cutting tool and thereafter feeding the cutting tool to obtain the desired machine operations. If selectivity among a plurality of cutting tools is desired an additional degree of mechanical freedom is required together with a suitable control therefor to select and accurately index a selected tool in operating position.

For practical reasons where a high degree of flexibility is desired it may not be expedient to intermix a number of different types of cutting tools such as milling cutters, boring tools and drills in a single tool assembly. Each imposes drive problems peculiar to its cutting movement requirements that are not conveniently resolvable in a single mechanical organization. For instance, flexibility in operation of a boring tool requires cutter radius adjustments in addition to the positioning and feeding movements. Where a plurality of boring tools are involved requiring selective positioning of the boring tools as well as cutter radius adjustment, the drive problem is different from that inhering for example with a drill. This consideration coupled with problems concerning the productivity of a single tool performing all machine operations on a particular work piece, indicates the need for a line of machine tools such as, mill, drill and bore, integrated by a work piece transfer mechanism, wherein the individual machines may be programmed to perform the particular machine operations referred to, after transfer and positioning of a work piece at a particular machine tool.

Such an arrangement affords the possibility of a high degree of flexibility in a single machine tool with minimum mechanical and electrical control complications.

The present invention is concerned with a single machine tool in such a machine tool line, namely a drill, and the discussions hereinafter are with particular reference to such a tool. Such reference, however, is solely in the interest of simplicity, since certain features of the arrangement are applicable in other tool assemblies. The invention contemplates an electromechanical machine tool organization for positioning and feeding a cutting tool, such as a drill, to perform a predetermined drilling operation on a properly positioned work piece.

The tool organization involves a plurality of cutting tool assemblies adjustably mounted in a suitable indexable support which provides selective indexing of the cutting tool assemblies in operative positions relative to a suitable cutting tool drive. A movable carriage assembly on the machine tool, supporting the cutting tool drive is power driven from a retracted position to engage the cooperating members of a separable clutch assembly, one clutch member being on the cutting tool drive and a cooperating clutch member being on each of the cutting tool assemblies, so that after indexing of a particular cutting tool assembly the clutch member thereon is operatively disposed with respect to the clutch member of the cutting tool drive. Thereafter a controllable carriage drive connected to drive the carriage, positions the cutting tool adjacent the work piece according to a positioning program. A separate power feed thereafter feeds the drill to perform the drilling operation. Initial movement of the power driven carriage from retracted position engages the clutch member of the power driven means with the cooperating clutch member on the indexed cutting tool assembly. A lock or latch mechanism displaceable from released to latched position upon initial movement of the carriage from fully retracted position, locks the carriage to the cutting tool assembly to lockup the clutch.

One object of this invention is to provide a machine tool arrangement which is simple with respect to operational requirements and positive in operation.

Another object of this invention is to provide a machine tool arrangement wherein accurate control of a particular cutting tool to afford accurate machine operations is obtainable.

A further object of this invention is to provide a machine tool organization automatically controllable by suitable power means under the input stimulus of an electrical program control wherein automatic selective positioning and feeding of a cutting tool with respect to a prepositioned work piece is obtainable within acceptable machining tolerances.

Further separate and combined objects of this invention are to provide a flexible machine tool assembly which is rugged, which is capable of accurate repetitive machine operations, which is easily programmed with respect to differing machine operations and which requires a minimum of instruction for particular machine operations and for selective machine operations.

The foregoing statements are illustrative of the various aims and objects of this invention. Other objects and advantages will become apparent from a study of the following specification when considered in conjunction with the accompanying drawings, in which:

Fig. 1 diagrammatically illustrates a machine tool organization exemplary of one embodiment of this invention;

Figure 3:
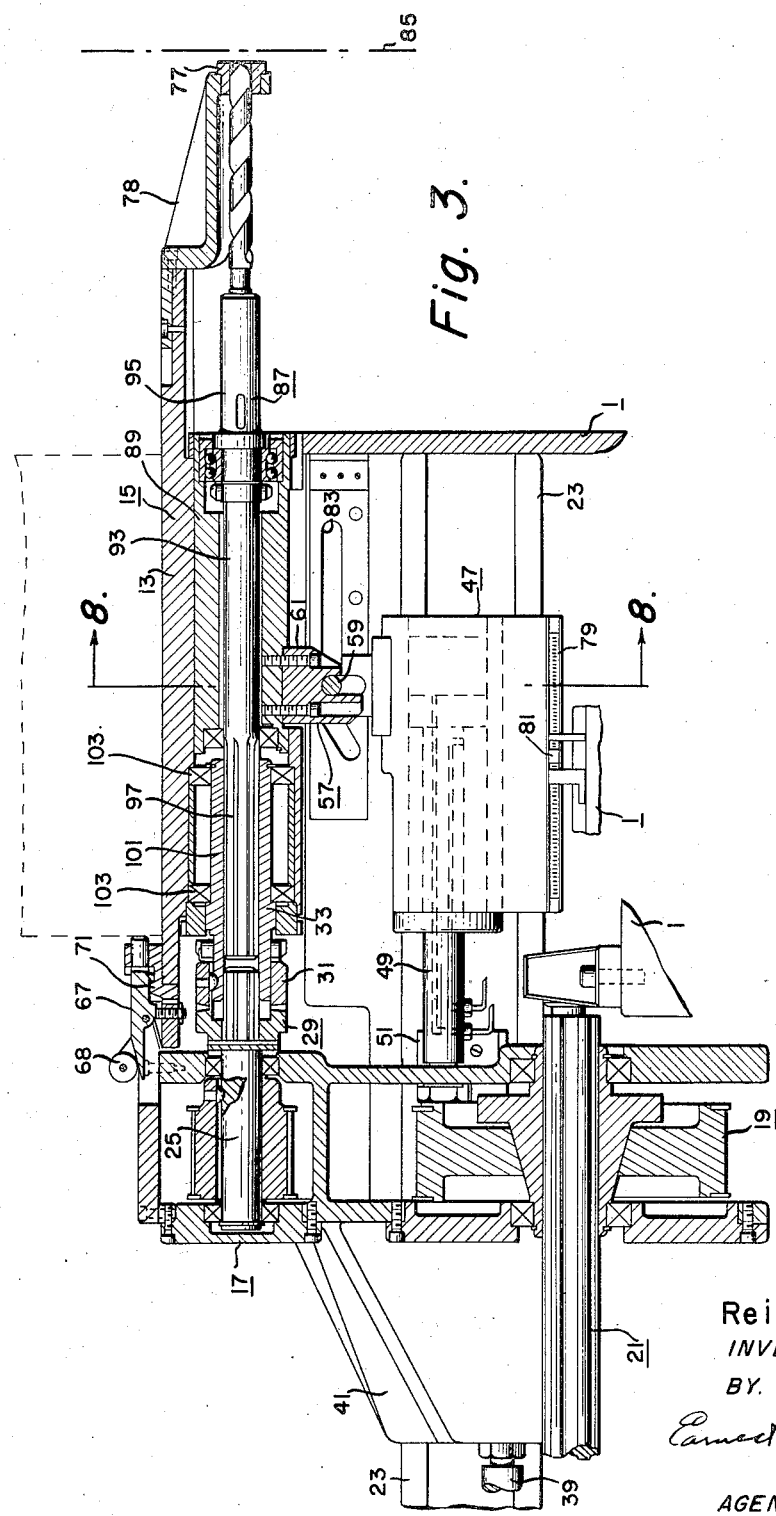
Fig. 3 is a longitudinal fragmentary cross section of the machine tool illustrated in Fig. 2.
Figure 4:
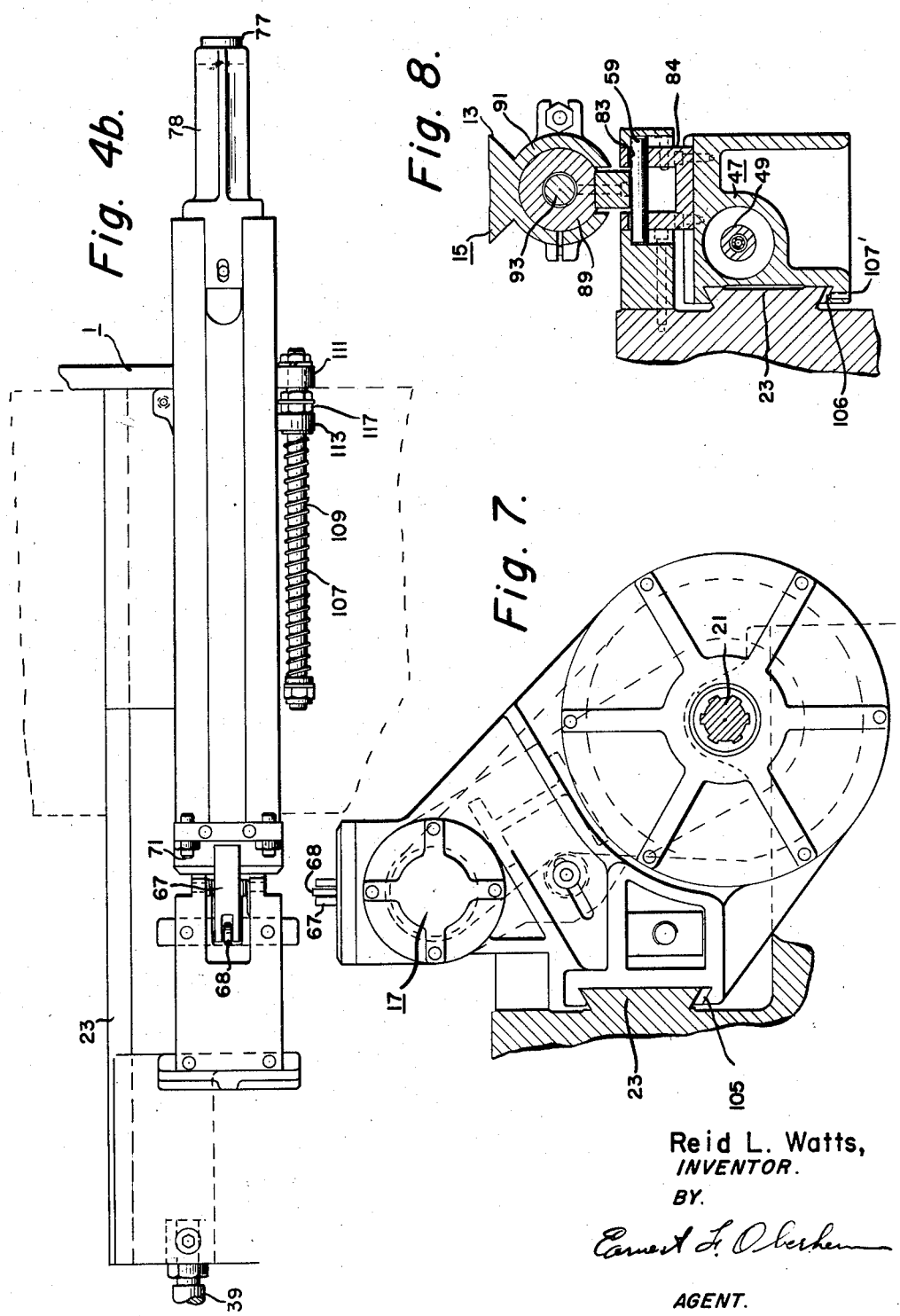
Figure 5:
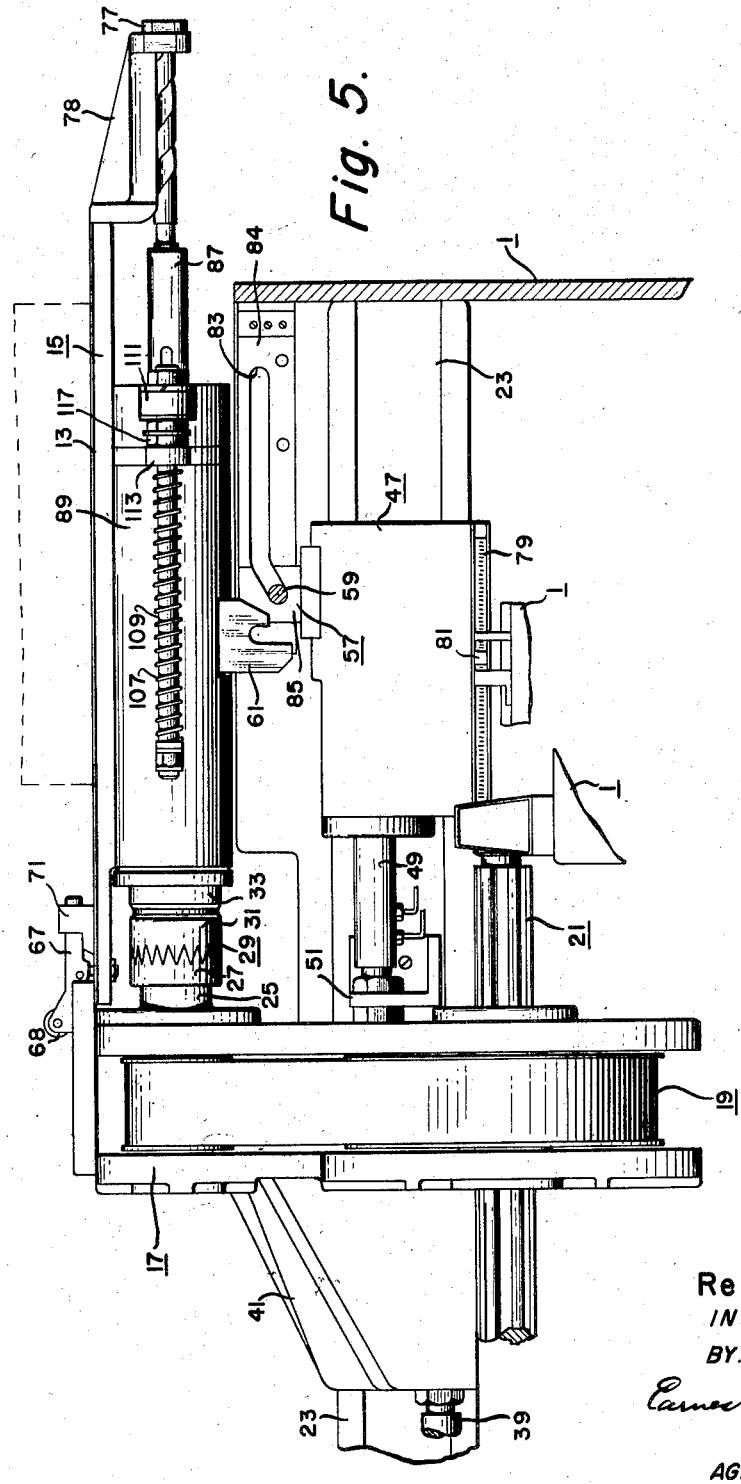
Figure 6:
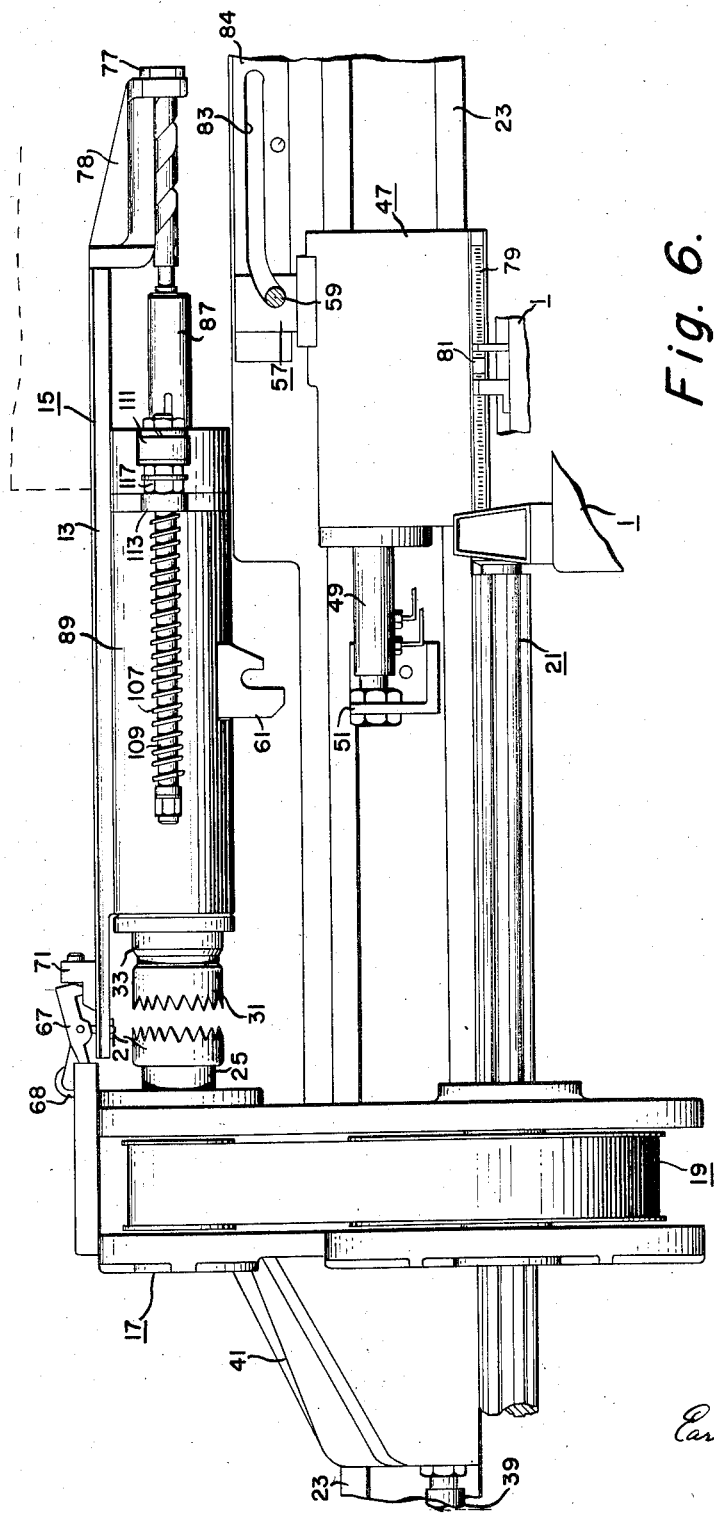

Figs. 4a and 4b together illustrate the top view of a portion of the machine tool assembly showing the carriage drive cylinder;

Fig. 5 is a fragmentary elevational view of the machine tool assembly showing the latch mechanism for the cutting tool in disengaged position with respect to the feed cylinder;

Fig. 6 is a fragmentary elevational view of the machine tool assembly showing the carriage in fully retracted position;

Fig. 7 is an end view of the drive carriage assembly showing its dove-tail slide connection to the machine tool; and Fig. 8 is a sectional view taken on the line VIII—VIII of Fig. 3 showing certain details of the releasable feed mechanism of the cutting tool assembly.

Figure 1:
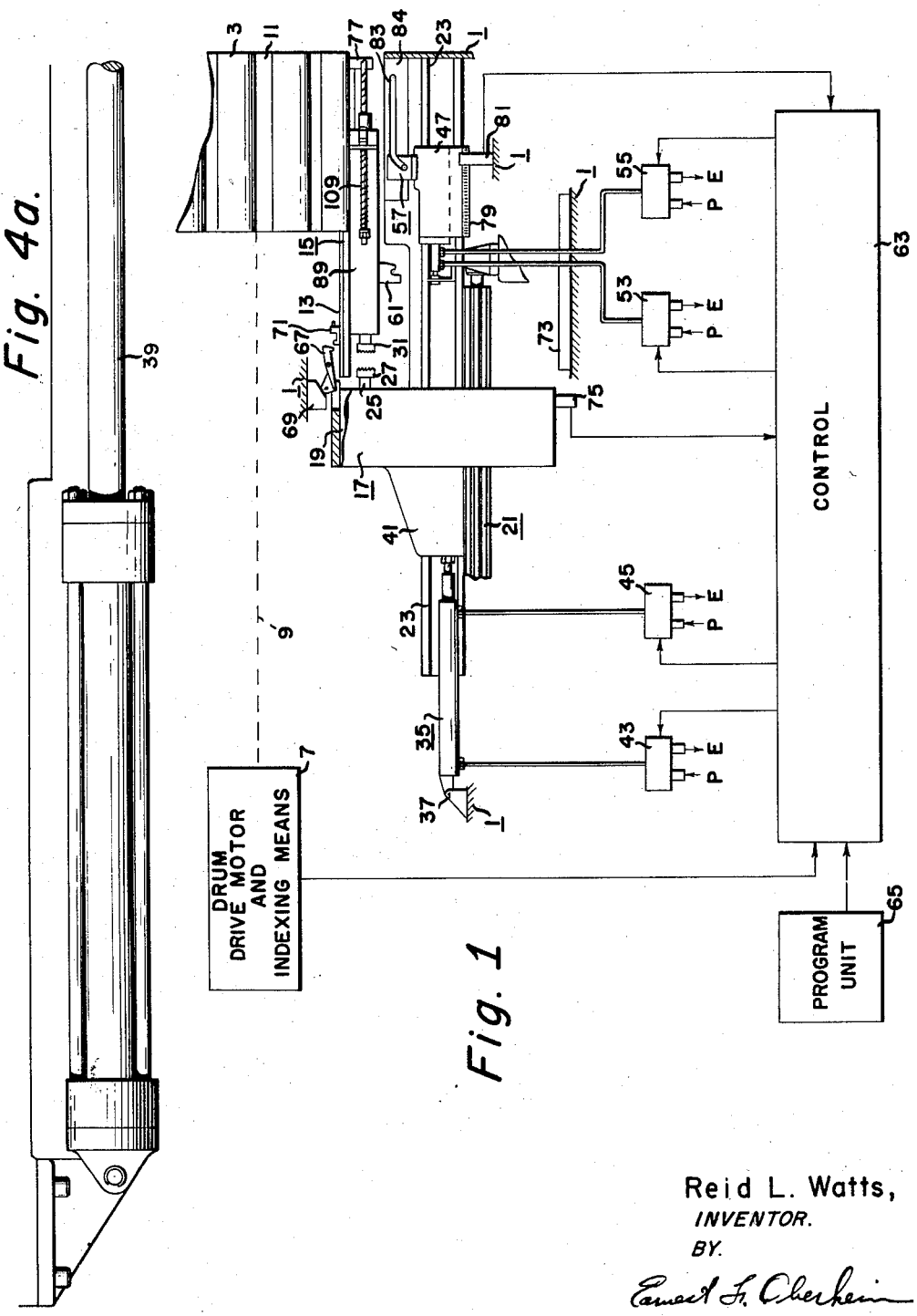
Figure 2:
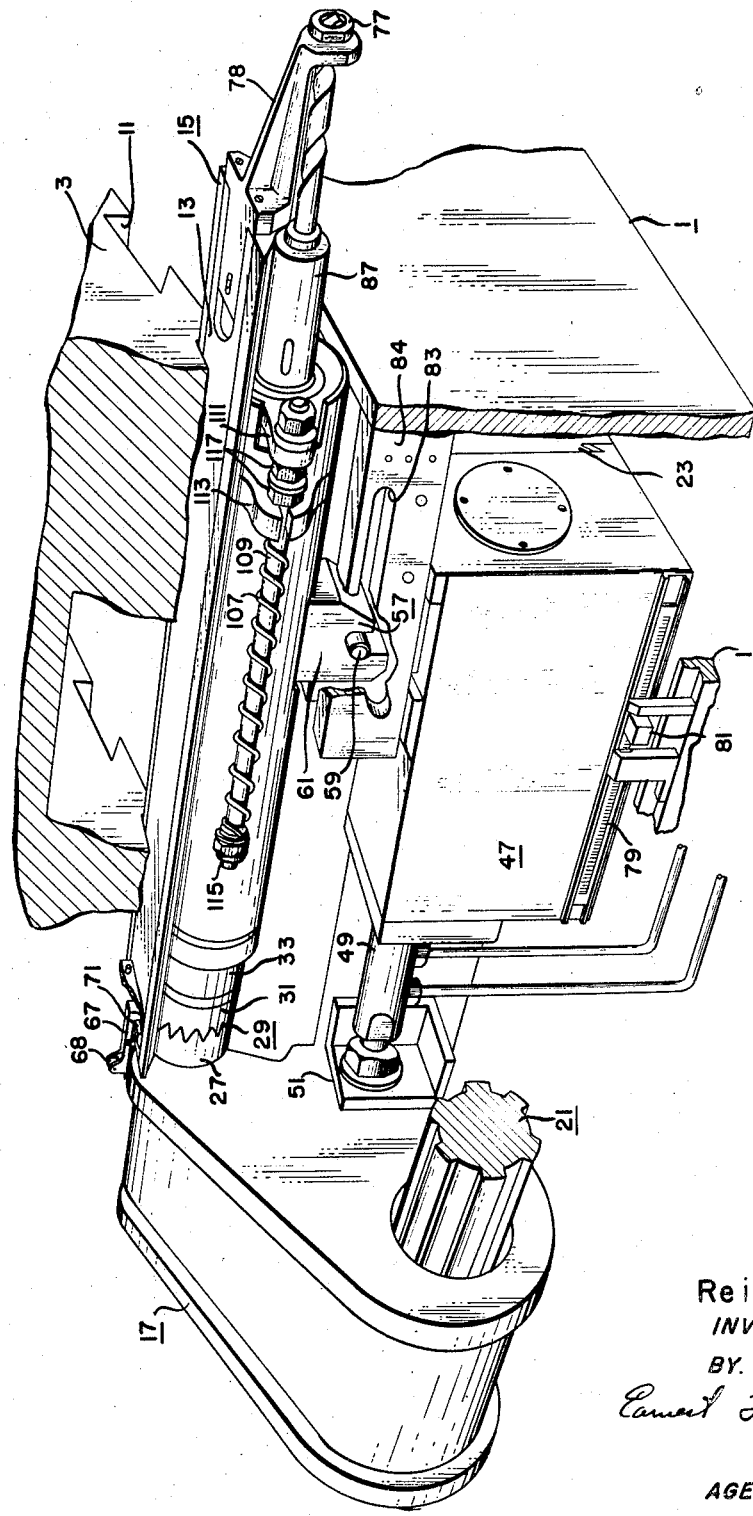
Fig. 2 is a fragmentary perspective illustration of the mechanical organization of a machine tool arrangement such as illustrated in Fig. 1.

Referring to Fig. 1 the tool assembly generally comprises a support 1. This support 1 may be the base of the machine or in instances where vertical positioning of the tool assembly is required may be a saddle slidably mounted for vertical movement, for instance, on the machine tool base. Still further, if horizontal positioning of the tool is required, longitudinal displacement of a support such as 1 may also be provided. Such additional supports and the additional degree of freedom provided by each such support, have not been illustrated in the interest of simplicity, since such arrangements are conventional and per se do not form part of the present invention. In Fig. 1 and in the other figures which follow, a complete showing of support 1 has not been made. It is to be understood, however, that the fragmentary showing of other supporting parts appearing in the several views all constitute a part of the support 1 and are therefore stationarily fixed with respect to support 1. All such fragmentary parts bear the same reference character.

An indexing drum 3 is suitably mounted in journals on the support 1. This drum is controlled by a diagrammatically illustrated drum drive motor and indexing means having a mechanical drive connection with drum 3 by means of a shaft, herein represented by a dotted line 9. Indexing drum 3 is provided with a plurality of circumferential spaced and axially extending dove-tail slots 11 to slidably receive dove-tail guides 13 forming part of the respective cutting tool assemblies 15 only one of which is shown. The cutting tool assembly illustrated is disposed in indexed position relative to a carriage assembly 17 which includes a cutting tool drive means 19, not illustrated in Fig. 1 but appearing in Fig. 3, including a pulley and belt drive arrangement slidably splined over a splined input power shaft 21. Carriage assembly 17 is mounted on a dove-tail guide 23 on support 1 and in the position shown is fully retracted. The cutting tool drive arrangement has an output shaft 25 terminating in a driving member 27 of a separable clutch assembly generally designated 29, the driven member 31 of which is mounted on a rotatable but axially fixed, hollow, tool spindle input shaft 33. The tool spindle which is splined into input shaft 33 (see Fig. 3) is slidably mounted for axial displacement in the cutting tool assembly 15, as will be explained in connection with Fig. 3. Carriage 17 is powered by a suitable motor, in this case a hydraulic motor represented in hydraulic cylinder 35, the left end of which as viewed is pivotally anchored to support 1 and the piston shaft 39 of which is anchored to a bracket 41 on carriage 17. Hydraulic fluid under pressure is selectively ported to opposite ends of cylinder 35 by means of a pair of valves 43 and 45, for tool spindle positioning and retracting movements. The pressure and exhaust ports of these valves are designated P and E, respectively. The hydraulic system associated therewith, normally including a hydraulic pump, an accumulator and interconnecting piping, has not been illustrated, again in the interest of simplicity, since such arrangement may be of conventional character for the present invention.

Power feed for the drill spindle is obtained by means of a power cylinder 47 also mounted on the dove-tail slide 23 on support 1. Piston shaft 49 of this power cylinder is stationarily secured to support 1 by means of a bracket 51 and hydraulic fluid under pressure is selectively ported to opposite sides of the piston (see Fig. 3) in cylinder 47 through separate fluid passages axially disposed in the piston shaft and having outlets on opposite sides of the piston. These passages are illustrated in dotted outline in Fig. 3 only. Hydraulic fluid under pressure is selectively ported to opposite sides of the piston in the power feed cylinder 47 by means of a pair of valves 53 and 55, the pressure and exhaust ports of which are respectively designated P and E and the outlet ports of which are connected to the respective passages in piston shaft 49.

Power cylinder 47 is separably engaged with the cutting tool spindle by means of a latch mechanism generally designated 57, the details of which will be described at a later point, which includes the separable latch parts 59 and 61 shown completely disengaged in Figures 1, 5 and 6.

Valves 43, 45, 53 and 55 are electrically controlled valves such as the conventional type of solenoid valves and are arranged to receive electrical controlling stimuli from a suitable control arrangement 63, herein designated in block form, which control arrangement in turn is under the control of a program unit also illustrated in block form and generally designated 65. Similarly, the indexing drum is under the control of control arrangement 63 as indicated by the connection of control 63 with the drum drive motor and indexing means 7.

For the purposes of description of the operation of the machine, all machine parts are illustrated in "home" position, that is, fully retracted. In this position, as may be seen, clutch 29 is fully disengaged and with the tool spindle fully retracted, latch 61 of the spindle drive mechanism 57 is clear of support 1. Thus drum 3 may be rotated which laterally displaces the cutting tool assemblies permitting selection of a desired assembly 15.

Assuming a digital control for the machine tool, the control arrangement 63 may comprise suitable digital counter arrangements for receiving binary electrical signals from the program unit 65. Such arrangements may include suitable arrays of flip-flop types of counters for the different operating modes and for other purposes, together with circulating registers and delay line arrangements for shifting and storing binary information. The program unit may be a tape reader device, for example, an arrangement which may be utilized to read perforated tape. Such tape readers conventionally include mechanical reader pin devices, or photosensitive devices, the latter selectively irradiated by light in accordance with predetermined patterns of holes in the tape. The control arrangement 63 under the control of program unit 65, sequentially controls the drive motor and indexing means 7, the carriage hydraulic cylinder 35 and the cutting tool spindle hydraulic cylinder 47, in the order named. In achieving such an operation, the information of the character required for the different operating modes may be sequentially programmed on the tape for the program unit and/or stored in the control 63.

On this basis the drum drive 7 first operates the drum 3 to select and index a cutting tool assembly 15 specified by the program unit. After indexing of the cutting tool assembly 15, the control 63 operates valves 43 and 45 connecting valve 43 to the supply of hydraulic fluid and valve 45 to exhaust. Hydraulic cylinder 35 is actuated, advancing the carriage 17 toward the right as viewed, engaging clutch member 27 with clutch member 31 of the clutch assembly 29. A latch mechanism includes a latch 67 pivotally mounted on carriage assembly 17. Latch 67 is biased to disengaged position in the fully retracted position shown, by means of a stationary cam 69 on support 1. Latch 67 may be spring loaded or gravity biased to rotate clockwise as viewed with the trailing edge thereof moving up the cam face of cam 69 as the drive mechanism moves from fully retracted position, whence, after engagement of the clutch, latch 67 may engage a suitable catch 71 on the cutting tool assembly 15 to secure the axial relationship of the cutting tool assembly and the drive carriage assembly. Further displacement of the drive carriage assembly 17 toward the right as viewed now also displaces the cutting tool assembly 15 towards the right, advancing the drill toward the work piece (not shown). The position in which the cutting tool assembly is to finally stop is programmed by the program unit.

In view of the digital character of the information handled by the control 63, a suitable indication of the actual or present position of the cutting tool assembly with respect to the desired position indicated by the program unit is desirable. This is obtained by means of a digital transducer assembly including a grooved scale 73 of magnetic material secured to support 1 and an electromagnetic type of transducer 75 functioning as a magnetic probe and capable of resolving the scale divisions of scale 73 defined by the grooves alternated by lands. An arrangement of this general character may be found in a copending application of D. F. Brower, Serial No. 588,711, filed June 1, 1956, and entitled Variable Reluctance Electromagnetic Device. It will be appreciated that any suitable type of digital transducer capable of producing discrete electrical signals in dependence upon positioning of a reference point in the transducer unit adjacent a groove or a land, may be employed. Scale 73 may be disposed so that the beginning of the scale divisions thereon constitutes a fixed reference point at which the actual position count may begin. In the cutting tool assembly illustrated, a bushing 77 in the end of a bracket 78 projects from the front end of the cutting tool assembly. The drill is rotatably and slidably mounted in this bushing which functions as a guide bearing for the drill to minimize translational travel of the drill during a drilling operation thus improving the accuracy of the drilling operation. In practice, positioning of the cutting tool assembly with respect to the work piece, involves positioning of the front face of this bushing adjacent the work piece face at which a hole is to be drilled, it being understood that the drill spindle and drill move integrally with positioning of the cutting tool assembly during this positioning operation. The programmed positioning operation positions the front face of this bushing at chip clearance distance from the face of the work piece to steady and stabilize the drill at that point. At this time, positioning movement is stopped. The programmed displacement in terms of the binary electrical signals from the program unit 65 indicates incremental distances to the desired position. The transducer assembly including scale 73 and electromagnetic head 75, produce corresponding discrete electrical signals indicating incremental distances corresponding to scale divisions. The transducer output is compared with the desired displacement signals and when the count differential is zero the hydraulic cylinder pressure is removed and the piston travel stops.

The rotating drill is now advanced into the work piece to perform the drilling operation. This event is also programmed on the basis of a desired distance for feed which is compared with an actual or present feed position. This is accomplished in a manner similar to that previously described, through the use of an additional scale 79 of a magnetic material which is provided with grooves alternated with lands and which is also resolved by means of an electromagnetic transducer head 81 functioning as a magnetic probe, to produce electrical signals corresponding to those of the desired feed position in control 63 and indicative of incremental displacements along scale 79. In this arrangement, scale 79 is secured to a skirt on cylinder 47 and the transducer head 81 is stationarily supported in cooperating relation with the scale 79. A differential in count between the desired feed position count programmed into control 63 and the scale count of transducer head 81, in this instance, results in operation of valve 53 to port fluid under pressure to the right hand side of the piston of cylinder 47. Since the piston is stationarily secured with respect to support 1, cylinder 47 is displaced to the right.

Prior to this, positioning of the cutting tool assembly so that the face of bushing 77 has been disposed within chip clearance distance of the work piece face has resulted in displacement of latch 61 on the drill spindle to the right to engage pin 59 forming part of the feed latch mechanism. It will be noted that the bottom of latch 61 terminates in a pair of legs of unequal length defining a slot 62 therebetween (see Fig. 3). The leading leg, that is, the right leg, is of shorter length than the left. Pin 59 rides in a slot 83 formed in a plate secured to support 1. This will be described in greater detail hereinafter. The left end of this slot slopes downwardly to the left, as viewed. In its fully retracted position, cylinder 47 moves pin 59 completely to the left of slot 83. In this position pin 59 is below the bottom end of the short leg of latch 61. When the cutting tool assembly is positioned in operating relation with respect to the work piece, the longer leg of latch 61 picks up pin 59 advancing it forwardly in slot 83. The connection of pin 59 with cylinder 47 displaces cylinder 47 to the right. The positioning movement is also programmed to fully elevate pin 59 into the horizontal portion of slot 83 in which position the pin is fully engaged in the forked extremity of latch 61. Thereafter the application of hydraulic pressure as described hereinabove to displace feed cylinder 47 toward the right, results in the advancement of the drill spindle relative to the cutting tool assembly to feed the rotating drill into the work piece.

The mechanical details of the tool organization will be better understood by particular reference to Figs. 2 through 8. In these figures, the drum 3 is only fragmentarily shown, the function of the drum having been explained in connection with Fig. 1. The drum in the remaining figures merely indicates the relative position of the cutting tool assembly 15 and the carriage assembly 17 with respect thereto. In the arrangement shown in Figs. 2 and 3 the drive carriage 17 and cutting tool assembly are shown in operating relationship with clutch assembly 29 fully engaged and with latch mechanism 67 in locked position. For the purposes of this discussion, it may be assumed that the cutting tool assembly has been advanced to the desired position with the face of drill bushing 77 positioned adjacent the work piece face indicated generally by the dot dash line 85 in Fig. 3. In this illustration the feed latch mechanism 57 is shown fully engaged, that is, pin 59 is securely seated in the slot in latch 61 in which position the feed stroke of cylinder 47 acts directly on the drill spindle of the cutting tool assembly 15.

In this illustration, the drill spindle assembly is generally designated 87 and includes a quill 89 which is axially slidably mounted in a cylindrical quill housing 91 integrally formed with dove-tail guide 13 and lying therebeneath (see Fig. 8). A portion at the left end on the bottom side of quill 89 is faced-off to form a flat seat to receive a cooperating face of latch 61 which is secured thereto by means of the bolts indicated. Latch 61 projects through a suitable axial slot in the bottom of the quill housing 91. The length of this slot determines the retracting stroke limit and the feed stroke limit of the quill assembly with respect to the quill housing. The drill spindle which is comprised of a shaft 93, terminating on the right side as viewed with a suitable chuck 95 and on its left end in a long spline 97, is rotatably mounted in bearings in the quill. The splined extremity 97 of shaft 93 strokes in a rotatably mounted internally splined bushing 101 which is mounted for rotation in bearings 103 disposed at axially spaced points therealong. The bearings 103 are secured against axial displacement in quill housing 91 and since the internally splined bushing 101 is locked against axial displacement against bearings 103 only rotation movement of the bushing occurs. Driven clutch member 31 is pinned to the left hand extremity of bushing 101, as viewed, and is therefore effective to transmit rotational motion to the bushing for the purpose of driving the drill spindle 93.

As will be seen by reference to Fig. 8 which is a sectional view taken on line VIII—VIII of Fig. 3, the slotted guide 84 is essentially U-shaped in cross section, pin 59 extending through the slotted side plates of slotted member 84 and terminating in a vertically slotted pin bracket 85. The vertical slots in the pin bracket do not extend through the slides thereof and thus confine the pin 59 within the slots 83. The pin therefore at all times remains within the slots 83 and, by reason of the connection of the pin bracket to the top of cylinder housing 47, the pin always remains connected with the cylinder.

In Fig. 3, latch 67 is shown in a position engaging the catch 71 which locks the cutting tool assembly 15 to the drive carriage 17. Thus carriage assembly 17 and the cutting tool assembly 15 travel as a unit in either of the positioning or retracting directions of movement of the carriage assembly under power of cylinder 35.

The top view of this complete assembly appears in Figs. 4a and 4b which show the position of all of the parts for the position of the cutting tool assembly and carriage assembly illustrated in Fig. 3.

Fig. 5 shows the connected cutting tool assembly and carriage assembly in a further retracted position in which the feed latch mechanism 57 is shown disengaged. In the retracting stroke of the power piston and also of the feed cylinder 47 when the pin 59 reaches the bottom of slot 83 as illustrated the short leg of the forked extremity of latch 61 passes over the top of pin 49 in a rearward direction, as shown, which disengages the feed latch mechanism 57.

The fully retracted position of the drive carriage and the cutting tool assembly is illustrated in Fig. 6. In this illustration the feed cylinder 47 remains in the position indicated with pin 59 in the bottom of slot 83. However, in this position, roller 68 on latch 67 engages the cam face of cam 69 displacing latch 67 counter clockwise and separating the latch from catch 71. The frictional restraint of the dove-tail connection between the dove-tail guide 13 and the dove-tail slots 11 in indexing drum 3 arrests further movement of the cutting tool assembly when the latch mechanism is disengaged. The carriage power cylinder stroke continues beyond this point to separate the clutch jaws or teeth in sufficient amount to separate the clutch members. Suitable limit switching (not shown) mechanically controlled by displacement of the drive carriage in the extreme of retracted position as well as in the extreme of movement in the positioning direction thereof, may be utilized to control valves such as 43 and 45 to provide effective limit stops on the carriage power piston travel.

As will be seen by reference to Figs. 7 and 8 both the drive carriage 17 and the feed cylinder 47 are mounted on the dove-tail guides 23. These guide assemblies may be arranged with suitable shims 105 and 106 as shown in Figs. 7 and 8, respectively, which may be adjusted by means of screws, such as 107' appearing in Fig. 8 for the purpose of tightening the dove-tail connection as wear occurs. In an automatic machine tool application, the resistance to movement of the machine tool parts in their respective sliding mounts is a factor which must be considered in connection with tool positioning. The high degree of accuracy required in final positioning necessitates a relatively uniform frictional restraint in any particular degree of freedom. In an analog system, the system damping will depend in large measure upon the mechanical friction damping on all the machine slides. Marked variations in frictional restraint may materially result in instability of the system. In a digital system, the control problem is of a different character. Where coasting is relied upon for final positioning after de-energization of the power units has taken place, marked departures in frictional restraint through wear of the slides may result in material amounts of overshoot of final position. By providing an arrangement such as herein disclosed it is possible through adjustment of the machine slides to calibrate the frictional restraint at periodic intervals to thereby maintain the mechanical friction load within reasonable operating limits.

As will be seen in Figs. 1, 2, 4b, 5 and 6 the drill spindle is spring loaded to retracted position. In the arrangement shown a coil spring 107 is disposed about a rod 109 which is threaded at both extremities. The right extremity of this rod is secured in a lug 111 which projects sidewardly from quill 89. A second lug 113, rearwardly of lug 111, projects from the side of the quill housing. Rod 109 slides through a suitable hole in lug 113. Spring 107 is compressed between nuts 115 threaded over the rear end of rod 109 and the quill housing lug 113. By reason of this spring loading, the drill spindle and the latch 61 connected to the quill which mounts the drill, is securely loaded against pin 59, that is, the short leg of latch 61 is securely loaded against the pin 59. The loading is sufficient to minimize or eliminate chattering of the quill as a result of axial travel within the limits of the clearance of pin 59 in the slot in latch 61. As will be seen by reference to Fig. 3 movement of quill 89 rearwardly in the quill housing is limited by the end of slot in the quill housing. Thus, the drill spindle in retracted position always occupies a fixed position within the quill housing. Nuts 117 threaded over rod 109 and engaging the front face of quill housing lug 113 control the displacement rearwardly of the drill spindle assembly in the quill housing. Adjustment of these nuts therefore determine the location of the cutting end of the drill with respect to the drill bushing 77.

Although but one specific embodiment of this invention has been illustrated, it will be appreciated that various detail changes in the parts may be made and that other types of tools may be used without departing from the organizational concept herein described. Accordingly, it is intended that the foregoing description and the showings made in the drawings shall be considered only as illustrative.

What is claimed is:

1. A machine tool assembly comprising: a carriage assembly; means slidably mounting said carriage for movement along a given path from and to a retracted position; a plurality of tool assemblies; an indexable member having indexing movement substantially laterally of said given path and slidably mounting each tool assembly for movement along a path substantially paralleling said given path; tool drive means on said carriage assembly, having an output shaft; a tool spindle slidably mounted in each tool assembly and having an input shaft operatively indexable with respect to said output shaft by said indexable member; a clutch assembly including a pair of separable clutch members respectively mounted on said input and output shafts and being normally separated when said carriage is in retracted position; power means connected to drive said carriage assembly from and to said retracted position; lock means disposed to connect said carriage assembly and said tool assembly after engagement of said clutch members in dependence upon predetermined movement of said carriage assembly from retracted position; power means connected to feed and retract said tool spindle; and control means connected to control both of said power means.

2. A machine tool assembly comprising: a carriage assembly, means slidably mounting said carriage assembly for movement along a path in tool positioning and tool retracting directions; a movable tool support; a plurality of tool assemblies rotatably and axially slidably mounted on said tool support, each tool support being axially slidable along a path substantially paralleling the path of movement of said carriage assembly; tool drive means on said carriage assembly having a rotatable output shaft; indexing drive means connected to drive said tool support and to index said tool support with a selected tool assembly in operable relation relative to said output shaft; a separable clutch assembly having a driving part connected to said output shaft and having a driven part on each tool assembly, said driven part on said selected tool assembly and said driving part being engageable and separable with positioning and retracting movement of said carriage assembly, adjacent the retracted position of said carriage assembly; movable locking means disposed to connect said carriage means to said selected tool assembly; means adjacent the retracted position of said carriage assembly, controlling said locking means to disconnect said selected tool assembly and said carriage assembly adjacent said retracted position of said carriage assembly, during retracting movement of said carriage assembly, to permit separation of said clutch parts, and to actuate said locking means during positioning movement of said carriage assembly after engagement of said clutch parts, to lock said tool assembly to said carriage assembly; a carriage drive motor connected to drive said carriage assembly in positioning and retracting directions; a tool feed motor connected to feed and retract said tool assembly; and control means connected to control both of said motors.

3. A machine tool assembly comprising: a main support; carriage means slidably mounted on said main support for movement along a path in tool positioning and tool retracting directions; a movable tool support; a plurality of tool assemblies rotatably and axially slidably mounted on said tool support, each tool assembly being slidable along a path substantially paralleling the path of movement of said carriage means; tool drive means on said carriage means having an output shaft; indexing drive means connected to drive said tool support and to index said tool support with a selected tool assembly in operable relation relative to said output shaft; a separable clutch having a driving part connected to be driven by said output shaft and a driven part on each of said tools, said driven part on said selected tool and said driving part being engageable and separable with positioning and retracting movement of said carriage means adjacent the retracted position of said carriage means; locking means for connecting said carriage means to said selected tool assembly; means adjacent the retracted position of said carriage means, controlling said locking means to unlock said selected tool assembly and said carriage means adjacent said retracted position of said carriage means during carriage retraction, to permit separation of said clutch parts and to actuate said locking means during carriage positioning movement after engagement of said clutch parts, to lock said tool assembly to said carriage means; a carriage drive motor connected to drive said carriage in positioning and retracting directions; a tool feed motor connected to feed and retract said tool assembly; and control means connected to control both of said motors.

4. A machine tool assembly comprising: a carriage assembly; means slidably mounting said carriage assembly for movement along a given path from and to a retracted position; a plurality of tool assemblies; an indexable member; an indexing drive connected to displace and index a surface of said indexable member laterally of said given path; means movably mounting said tool assemblies with respect to said surface in laterally spaced relation for movement along respective paths substantially paralleling said given path; tool drive means on said carriage and having an output shaft; a tool spindle rotatably and axially movable in each tool assembly from and to a retracted position for feeding and retracting said tool and having an input shaft; a clutch having a pair of separable clutch members, one being mounted on said output shaft and the other being mounted on said input shaft and being normally separated when said carriage is in said retracted position; carriage motor means connected to drive said carriage from and to retracted position; feed motor means connected to feed and retract said tool spindle; and a lock movably mounted on said carriage and operable to mechanically engage said carriage and said tool assembly after engagement of said clutch members in dependence upon predetermined movement of said carriage from retracted position.

5. A machine tool assembly comprising: a carriage assembly; means slidably mounting said carriage assembly for movement along a given path from and to a retracted position; a plurality of tool assemblies; an indexable member; an indexing drive connected to displace and index a surface of said indexable member laterally of said given path; means movably mounting said tool assemblies with respect to said surface in laterally spaced relation for movement along respective paths substantially paralleling said given path; tool drive means on said carriage and having an output shaft; a tool spindle rotatably and axially movable in each tool assembly from and to a retracted position for feeding and retracting said tool and having an input shaft; a clutch having a pair of separable clutch members, one being mounted on said output shaft and the other being mounted on said input shaft and being normally separated when said carriage is in said retracted position; carriage motor means connected to drive said carriage from and to retracted position; feed motor means connected to feed and retract said tool spindle; a lock movably mounted on said carriage and operable to mechanically engage said carriage and said tool assembly after engagement of said clutch members in dependence upon predetermined movement of said carriage from retracted position; and control means connected to sequentially control said indexing drive, said carriage motor means and said feed motor means, in the order named.

6. A machine tool assembly comprising: a carriage assembly; means slidably mounting said carriage assembly for movement along a given path from and to a retracted position; a plurality of tool assemblies; an indexable member; an indexing drive connected to displace and index a surface of said indexable member laterally of said given path; means movably mounting said tool assemblies with respect to said surface in laterally spaced relation for movement along respective paths substantially paralleling said given path; tool drive means on said carriage and having an output shaft; a tool spindle rotatably and axially movable in each tool assembly from and to a retracted position for feeding and retracting said tool and having an input shaft; a clutch having a pair of separable clutch members, one being mounted on said output shaft and the other being mounted on said input shaft and being normally separated when said carriage is in said retracted position; carriage motor means connected to drive said carriage from and to retracted position; feed motor means connected to feed and retract said tool spindle; a movable latch member on said carriage; a latch actuator stationarily disposed adjacent said retracted position of said carriage; and means connected with said tool assembly and disposed for engagement by a cooperating part of said latch member when said latch mmeber is in latched position; said latch actuator moving said latch member to released position in said retracted position of said carriage and effecting movement of said latch member to engaged position with respect to said tool assembly, with movement of said carriage assembly from retracted position, after engagement of said clutch members.

7. A machine tool assembly comprising: a carriage assembly; means slidably mounting said carriage assembly for movement along a given path from and to a retracted position; a plurality of tool assemblies; an indexable member; an indexing drive connected to displace and index a surface of said indexable member laterally of said given path; means movably mounting said tool assemblies with respect to said surface in laterally spaced relation for movement along respective paths substantially paralleling said given path; tool drive means on said carriage and having an output shaft; a tool spindle rotatably and axially movable in each tool assembly from and to a retracted position for feeding and retracting said tool and having an input shaft; a clutch having a pair of separable clutch members, one being mounted on said output shaft and the other being mounted on said input shaft and being normally separated when said carriage is in said retracted position; carriage motor means connected to drive said carriage from and to retracted position; feed motor means connected to feed and retract said tool spindle; a movable latch member on said carriage; a latch actuator stationarily disposed adjacent said retracted position of said carriage; means connected with said tool assembly and disposed for engagement by a cooperating part of said latch member when said latch member is in latched position; said latch actuator moving said latch member to released position in said retracted position of said carriage and effecting movement of said latch member to engaged position with respect to said tool assembly, with movement of said carriage assembly from retracted position, after engagement of said clutch members; and control means connected to sequentially control said indexing drive, said carriage motor means and said feed motor means, in the order named.

References Cited in the file of this patent

UNITED STATES PATENTS

| | | |
|---|---|---|
| 1,461,755 | Cox | July 17, 1923 |
| 2,536,006 | Linden et al. | Dec. 26, 1950 |
| 2,736,852 | Nelson | Feb. 28, 1956 |
| 2,745,167 | Cross | May 15, 1956 |